United States Patent [19]

Kremers et al.

[11] 4,412,121

[45] Oct. 25, 1983

[54] IMPLEMENT POSITIONING APPARATUS AND PROCESS

[75] Inventors: Jan H. Kremers, Boulder Creek; Robert C. Bolles, Mountain View, both of Calif.

[73] Assignee: S R I International, Menlo Park, Calif.

[21] Appl. No.: 297,514

[22] Filed: Aug. 28, 1981

[51] Int. Cl.³ .............................................. B23K 9/10
[52] U.S. Cl. ............................... 219/124.34; 318/577; 356/376; 358/107
[58] Field of Search ...................... 219/124.34, 124.22, 219/130.01, 124.02, 130.21; 358/107, 139; 356/376; 318/569, 575, 577

[56] References Cited

U.S. PATENT DOCUMENTS 4,212,073 7/1980 Balasubramanian ................ 356/376

FOREIGN PATENT DOCUMENTS 2500182 7/1976 Fed. Rep. of Germany ........................ 219/124.34
2711660 9/1978 Fed. Rep. of Germany ........................ 219/124.22
55-50984 4/1980 Japan ............................. 219/124.34

Primary Examiner—C. C. Shaw
Attorney, Agent, or Firm—Edward B. Gregg; Willis E. Higgins; Urban H. Faubion

[57] ABSTRACT

An apparatus for controlling positioning of an implement relative to a workpiece, such as a welding head with respect to members to be welded, projects light patterns including an array of light elements each having a known shape and spacing relative to one another on the workpiece. The light elements as reflected from the workpiece are detected and output signals produced in response to the detected light elements. The output signals are classified into groups based on at least one common characteristic resulting from workpiece geometry. The workpiece geometry is defined from at least one relationship between different ones of the groups of the first output signals. Second output signals are produced indicative of the so-determined workpiece geometry. The second output signals are used to control positioning of the implement relative to the workpiece. This apparatus and process allows workpiece geometry to be defined and the implement to be positioned relative to the workpiece on a real-time basis.

14 Claims, 17 Drawing Figures

IMPLEMENT POSITIONING APPARATUS AND PROCESS

CROSS REFERENCE TO RELATED APPLICATION

This application and a concurrently filed, copending application Ser. No. 297,911, filed Aug. 31, 1981 by Jan H. Kremers and Alfred E. Brain, entitled "Image Acquisition Apparatus and Process", contain claims to related inventions.

BACKGROUND OF THE INVENTION

1. Field of the Invention

This invention relates to an improved apparatus and process for positioning an implement, such as a welding head, relative to a workpiece using visual sensing. More particularly, it relates to such an apparatus and process suitable for real time automatic control of arc welding, in which a variety of different shaped workpieces are to be welded.

2. Description of the Prior Art

It has been recognized for some time that it would be desirable to provide an automated arc welding apparatus and process. There is a large and growing shortage of skilled welding operators. This shortage is aggravated by the poor working environment in most arc welding installations, and the consequent high rate of personnel turnover. There is also an increasing government and union pressure to remove people from dangerous or potentially unhealthful environments.

In addition to the above factors, there is a continuing and growing need to decrease direct labor costs incurred in the manufacture of arc-welded goods. The significance of this need is highlighted by the fact that labor and associated overhead charges account for more than 80% of the direct costs per unit length of weld.

Further, there is an increasing use in automotive and other industries of materials that are very sensitive to weld defects. Such materials require more consistent weld quality than can be provided by a human operator.

While a variety of approaches has been proposed for automatic positioning of weld heads, it should be recognized that, in many manual welding operations, the human operator functions not only as a manipulator, but also as a real time sensing and feedback medium, making small adjustments in welding parameters and procedure to accommodate perceived changes in joint orientation, dimensions and fit-up. To some extent, this accommodation can be provided by specially designed hard tooling or by a preprogrammed positioner. In many manufacturing situations, however, this approach is not feasible due to the inherent inaccuracy of the forming and cutting processes used in workpiece production and by other unpredictable thermal and mechanical effects. It is therefore necessary to equip an automated welding system with the capability of acquiring and analyzing sensory data in real time. This enables the welding apparatus to follow the joint in space, and at the same time adjust welding parameters, such as wire feed and travel speeds, torch attitude and arc voltage. Real time data acquisition and analysis further would allow an automatic welding system to select among alternative welding procedures, such as "stringering", i.e., weaving to bridge fit-up gaps, to accommodate variations in joint type, geometry, location, and fit-up.

Presently available sensors for arc welding fall into three general categories. The first category utilizes some form of mechanical or tactile contact devices, such as electromechanical probes and various forms of guide rollers and pins. The second category utilizes eddy current sensing devices. The third category employs feedback from such welding parameters as arc voltage or current waveforms to control the welding.

Such systems suffer from a number of disadvantages. Both mechanical and eddy current devices must be mechanically reconfigured for different joint types, such as butt joints and fillet joints. Further, mechanical and eddy current sensors must either contact the workpiece or be in close proximity to it during operation. Contact between a workpiece and a sensing element will produce mechanical wear. Maintaining a noncntact sensor in close proximity to the workpiece creates an increased probability of mechanical damage to the sensing element.

Recognizing the problems associated with the above three types of welding control systems, various proposals have been made in the prior art for visual determination of welding workpiece geometry. For example, U.S. Pat. No. 3,976,382 discloses a system in which a light source is used in combination with a light shield positioned close to the workpiece to cast a shadow of known predetermined shape on the workpiece. Variation of the shadow from the known shape then provides a basis for characterizing the shape of the workpiece. However, that technique requires the shield to be positioned close to the workpiece. The shadow technique is therefore subject to many of the same disadvantages as the eddy current technique described above.

Another welding head positioning system which utilizes a visual sensor is disclosed by T. Nozaki, et al., "Robot 'Sees', Decides and Acts", *Welding and Metals Fabrication*, Vol. 47, No. 9, pp. 647–658 (November, 1979). However, that system requires user entry in use of the system of certain welding geometry information, and it is limited in the types of welds that can be accommodated, because of the limited information on weld geometry that can be obtained with the visual sensor there disclosed.

Thus, while a substantial amount of work has already been done on automatic positioning apparatus for weld heads and similar implements, a need still remains for further development of an automatic apparatus for positioning an implement relative to a workpiece, which will meet the stringent demands of welding processes on such apparatus.

SUMMARY OF THE INVENTION

Accordingly, it is an object of this invention to provide an apparatus and process for positioning an implement relative to a workpiece which provides a sufficient amount of information using light reflected from the workpiece rapidly enough to define the workpiece geometry and carry out the positioning on a real time basis.

It is another object of the invention to provide a welding head positioning apparatus and process which is capable of simultaneous measurement of three-dimensional welding joint location, geometry and fit-up.

It is a further object of the invention to provide an implement positioning apparatus and process which will provide a sufficient amount of information about different shaped three-dimensional workpieces to allow implementation of positioning on a real time basis, without requiring mechanical reconfiguration of the apparatus for different shaped workpieces.

It is still another object of the invention to provide such an implement positioning apparatus and process in which sensor elements are located remote from the workpiece.

It is a still further object of the invention to provide such an automatic weld head positioning apparatus and process which will provide a more consistent weld quality than obtainable with a human operator.

The attainment of these and related objects may be achieved through use of the novel apparatus for controlling the positioning of an implement relative to a workpiece and process for controlling such positioning herein disclosed. Apparatus of this invention includes a means for projecting a light pattern including an array of light elements each having a known shape and spacing relative to one another on the workpiece. A means, spaced from the projecting means, is provided for detecting the array of light elements as reflected from the workpiece and for producing first output signals in response to the detected light elements. The apparatus further includes a means for classifying the first output signals into groups based on at least one common characteristic resulting from workpiece geometry for the first output signals of each group. A means in the apparatus for defining workpiece geometry does so from at least one relationship between different ones of the groups of first output signals and produces second output signals indicative of the so-determined workpiece geometry. A positioning means in the apparatus is responsive to the second output signals, to position the implement relative to the workpiece.

A positioning process in accordance with the invention includes projecting a light pattern including an array of light elements, each having a known shape and spacing relative to one another, on a workpiece with respect to which an implement is to be positioned. The array of light elements as reflected from the workpiece is sensed. The sensed light elements are clustered into groups based on at least one common characteristic resulting from workpiece geometry of the light elements as reflected. Workpiece geometry is defined from at least one relationship between different ones of the clustered groups of sensed light elements. The positioning of the implement and the workpiece relative to one another is then controlled, based on the so-defined workpiece geometry.

The apparatus and process of this invention provides a sufficient amount of sensed information from light projected on the workpiece and processes the information rapidly enough so that an implement can be positioned relative to workpieces of widely varying shapes on a real-time basis. While the apparatus and process of this invention can be used to position a wide variety of different implements relative to workpieces of varying geometry, the apparatus and process is especially adapted for use in positioning an arc welding head with respect to members to be welded together in different configurations. This is particularly true if the apparatus and process also incorporates the subject matter of the above-referenced copending Kremers and Brain application, the disclosure of which is hereby incorporated by reference herein.

The attainment of the foregoing and related objects, advantages and features of the invention should be more readily apparent to those skilled in the art after review of the following more detailed description of the invention, taken together with the drawings, in which:

DETAILED DESCRIPTION OF THE INVENTION

Figure 1:
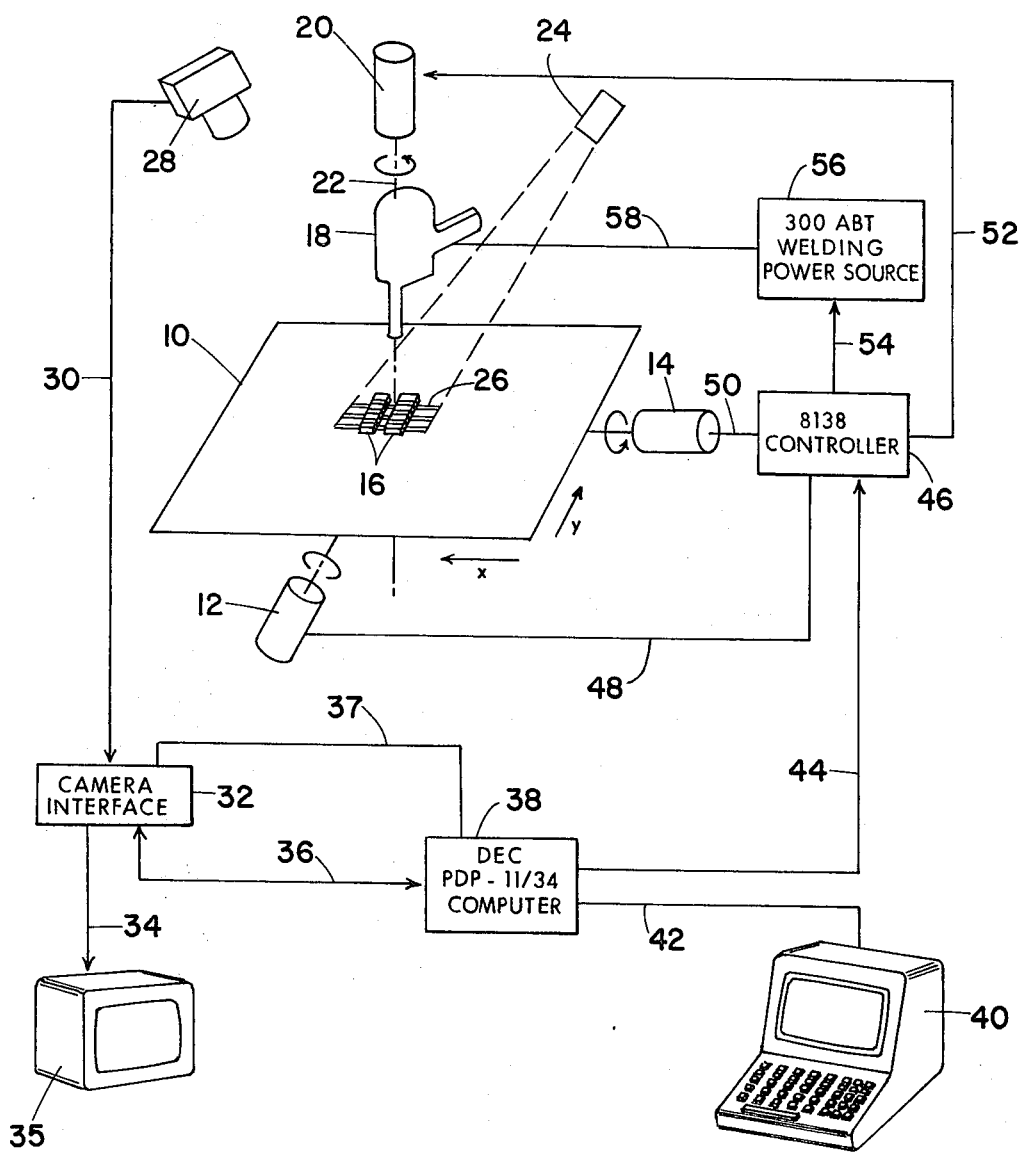
FIG. 1 is an apparatus in accordance with the invention, shown partially in perspective form and partially in schematic form.

Turning now to the drawings, more particularly to FIG. 1, there is shown an apparatus in accordance with the invention. The apparatus includes an x-y table 10 driven by stepping motors 12 and 14. A workpiece 16 to be welded is positioned on the x-y table 10. A welding gun 18 of known type incorporating a welding wire feeder is mounted above the x-y table 10. In this embodiment, the workpiece 16 is thus moved to position it beneath the stationary welding gun 18. Of course, it is also possible to have the workpiece 16 remain stationary and move the welding gun 18 along the workpiece 16 to make a weld. A third stepping motor 20 is connected to the welding gun 18 for pivoting the welding gun 18 about z axis 22. In practice, a manually operable rotary stage (not shown) is also provided to adjust the angle that welding gun 18 makes with respect to the plane of x-y table 10.

A light source 24 is positioned above the x-y table 10 to illuminate the workpiece 16 to be welded with a light pattern 26. Further details on the nature of light pattern 26 are presented below in connection with the discussion of FIG. 6. Although the light source 24 can be implemented with any source that will project a pattern 26 having the characteristics discussed below on the workpiece 16, it is preferred to implement the light source 24 as a small, mechanically rugged projector head which receives a slide containing a suitable image for generation of the pattern 26. Such a projection head is desirably connected by a fiber optics bundle to an incandescent light source (not shown), remotely positioned from the welding gun 18 and x-y table 10 for reliability.

A television camera 28 is positioned remote from the light source 24 to receive the light pattern 26, as reflected from the workpiece 16. It is important that the camera 28 be positioned remote from the light source 24, to give a different angle with respect to the workpiece 16, because the present invention utilizes triangulation, discussed more fully below, to determine three dimensional characteristics of workpiece 16 from a two dimensional image. Although essentially any television camera is appropriate, in a preferred embodiment, a General Electric model TN 2500 CID solid state television camera is employed. Output 30 of the camera 28 is connected to camera interface circuits 32, which supply either a raw grey scale or a thresholded binary image on output 34 to a conventional television monitor 35, depending on a control input to the interface circuits 32 on line 37 from computer 38. The camera interface circuits 32 also have an output 36 as a direct memory access (DMA) input to computer 38. Further details on the camera interface circuits 32 are shown in FIG. 2, discussed below.

Computer 38 may be essentially any commercially available minicomputer, implemented in the preferred embodiment with a PDP-11/34 minicomputer, available from Digital Equipment Corporation, Maynard, Mass. User access to the computer 38 is provided by means of a display terminal 40, such as a Tektronix 4006 display terminal, obtainable from Tektronix, Inc., Beaverton, Oreg. The display terminal 40 is connected to computer 38 by line 42. Computer 38 carries out analysis of data supplied by the camera interface circuits 32 on line 36, using a stored data analysis program, discussed below. Terminal 40 is used to display results of operations carried out on image data supplied to computer 38 on line 36 and to allow user access to computer 38.

Outputs from the computer 38, based on the data analysis, are supplied on line 44 to controlled 46. Line 44 is desirably implemented as a 1200-Baud, RS 232 type serial line. Controller 46 is connected to the stepping motors 12, 14 and 20 by lines 48, 50 and 52, respectively, to control positioning of the x-y table 10 and the welding gun 18. The controller 46, in a preferred embodiment, is implemented by a Summit Engineering model 8138 controller. Line 54 further connects the controller 46 to a welding power source 56, such as a Miller Electric model 330 ABT constant current welding power source, which is connected to the welding gun 18 by line 58.

Figure 2:
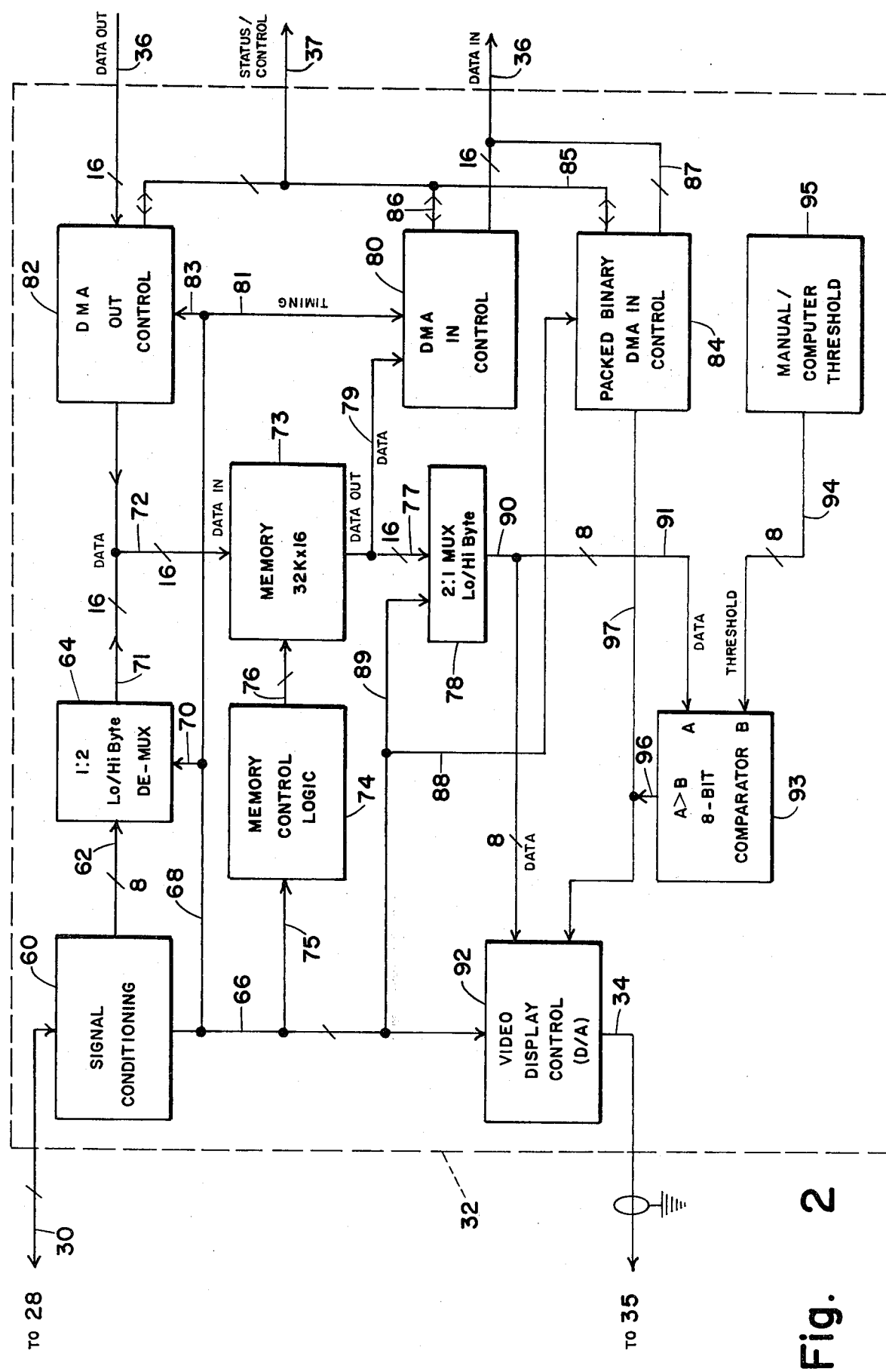
FIG. 2 is a more detailed block diagram of a portion of the apparatus shown in FIG. 1.

Further details of the camera interface circuit 32 are shown in FIG. 2. Bus 30 connects television camera 28 to a signal conditioning circuit 60. Signal conditioning circuit 60 performs the functions of level shifting, waveform shaping and isolation of the camera 28 from the remainder of the circuits in interface 32. Bus 62 supplies data from the signal conditioning circuit 60 to 1:2 demultiplexer circuit 64. Signal conditioning circuit 60 also supplies a timing signal to demultiplexer 64 via busses 66, 68 and 70. Busses 71 and 72 provide data from the demultiplexer 64 to memory 73. Memory control logic circuits 74 receive timing signals from signal conditioning circuit 60 on busses 66 and 75. Output 76 of the memory control logic 74 is connected to the memory 73. Output bus 77 from memory 73 is connected to 2:1 multiplexer 78, and via vus 79, to DMA input control circuit 80. DMA input control circuit 80 also receives a timing input via busses 66, 68 and 81 from signal conditioning circuit 60. Bus 36 supplies data from DMA input control circuit 80 to computer 38 (FIG. 1).

Bus 36 also supplies data from computer 38 to DMA output control circuit 82. Busses 71 and 72 supply data from the DMA output control circuit 82 to memory 73. DMA output control circuit 82 receives timing signals from signal conditioning circuit 60 on busses 66, 68 and 83.

A packed binary DMA input control circuit 84 is connected to DMA input control circuit 80 and DMA output control circuit 82 by busses 85 and 86. Busses 85, 86 and 37 also connect the DMA input control circuit 80, the DMA output control circuit 82, and the packed binary DMA input control circuit 84 to computer 38 for transmission of status and control signals. The packed binary DMA control circuit 84 is also connected to bus 36 by bus 87. A timing signal is supplied to packed binary DMA input control circuit 84 from signal conditioning circuit 60 via busses 66 and 68. Bus 89 also supplies these timing signals to multiplexer 78. Multiplexer 78 supplies data on busses 90 and 91 to video display control circuit 92 and comparator circuit 93, respectively. Video display control circuit 92 is a digital-to-analog (D/A) converter. Output 34 of the video display control circuit 92 supplies input signals to video monitor 35 (FIG. 1) via line 34.

Comparator 93 receives a threshold input on bus 94 from manually settable or computer settable threshold circuit 95. If the data supplied on bus 91 is above the threshold on bus 94, comparator 93 provides an enable signal on lines 96 and 97 to packed DMA input control circuit 84 and video display control circuit 92.

Figure 3:
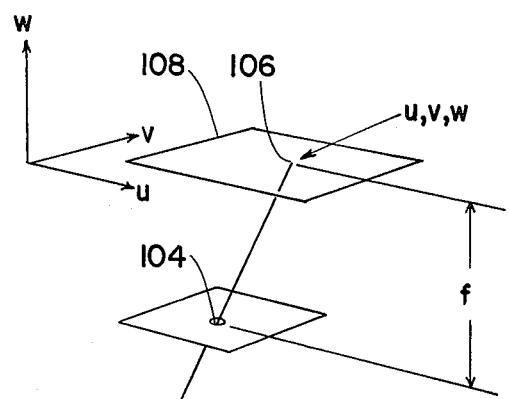
FIG. 3 is a perspective view showing certain relationships useful for an understanding of the invention.
Figure 3:
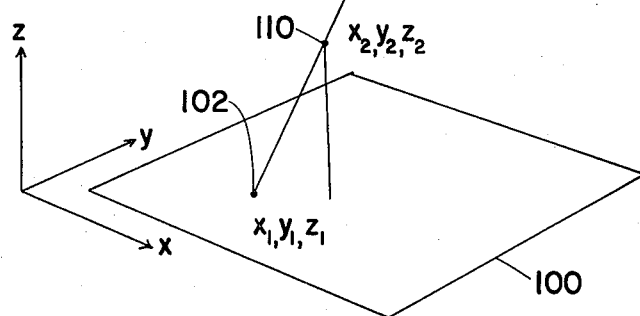

FIG. 3 is useful in understanding the process of extracting three-dimensional geometrical data from a two-dimensional image. As shown, an object plane 100 has a point 102 of coordinates $x_1, y_1, z_1$, which is projected through pinhole 104 to give an image 106 in image plane 108, having coordinates u, v, w. Using similar triangles, it will be seen that the image 106 coordinates, u, v, w, of the point 102 with coordinates $x_1$, $y_1$, $z_1$, are $$\frac{u}{f} = \frac{x_1}{f + z_1} \qquad (1)$$

$$w = o$$

$$\frac{v}{f} = \frac{y_1}{f + z_1}$$

It should be noted that this transformation is ambiguous in that the point 110 having coordinates $x_2, y_2, z_2$, also transforms into the same image point. If, however, in Equation (1), one of the coordinates is known, say x, it will then be possible to solve uniquely for y and z. What is needed, therefore, is a method of providing the value of one of the coordinates automatically, or some other linear constraint.

Figure 4:
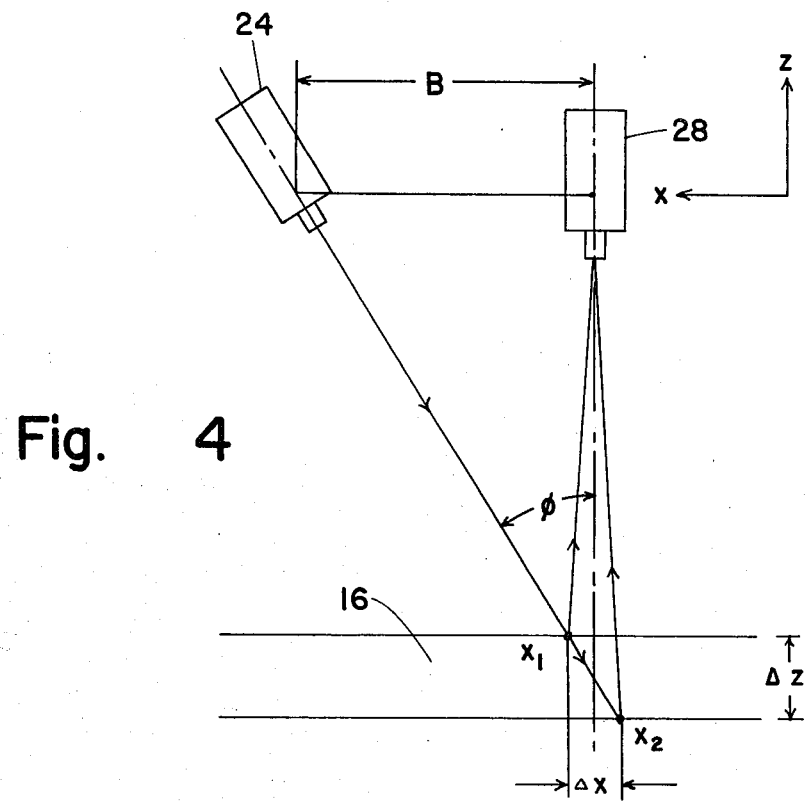
FIG. 4 is a front view of a portion of the apparatus shown in FIG. 1, also showing certain relationships useful for a further understanding of the invention.

One means of providing these data is to project a spot of light onto the workpiece from a known vantage point slightly displaced from the camera. FIG. 4 shows an elevation view of such an arrangement, in which light source 24 is displaced from camera 28 above workpiece 16. Taking the camera as the origin, the principal ray of the camera as the Z axis, and displacing the projector along the X-axis, we find that the equation of the principal ray of the projector is given by:

$$x = z \tan \theta + B \qquad (2)$$

where $\theta$ is the angle between the principal rays of the camera and the projector, and B (the X intercept) is known as the baseline distance.

Inserting Equation (2) into Equation (1) and solving for x, y, and z in terms of the known quantities, u, v, $\theta$ and B, we have:

$$x = \frac{f \tan \theta (B - u)}{(u - f \tan \theta)} \qquad (3)$$

$$y = \frac{v(B - f^2 \tan \theta)}{f(u - f \tan \theta)}$$

$$z = \frac{f(B - u)}{u - f \tan \theta}$$

This simple system may be used to measure the height of a single point on a plane. To determine the orientation of the plane with respect to the z-axis, we may replace this single spot of light with a stripe, projected so as to be parallel with the y-axis. The elevation of each point on the stripe, and hence the rotation of the plane about the x-axis, may be determined by applying Equation (3) to each point in the stripe image.

Figure 5:
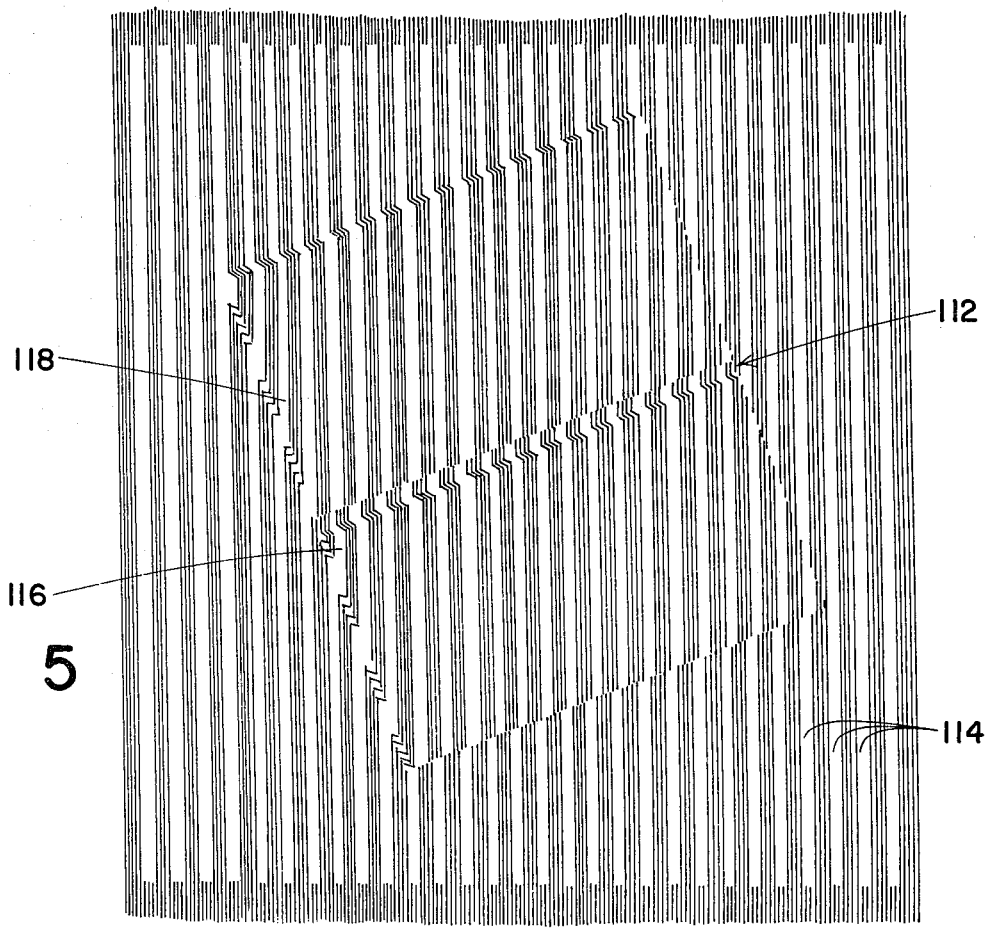
FIG. 5 is a plan view of a workpiece illustrating certain relationships useful for understanding the invention.

A further extension of this scheme is possible by projecting several stripes at once. By calibrating the system so that the angle $\theta$, or as an equivalent, the three-dimensional equation of each plane of light is known for each stripe, the three-dimensional orientation of the surface over the entire area of the projected pattern may be likewise computed. If the scene consists of several surfaces, the outline of each may be inferred by the discontinuous distortions introduced by edges, corners, and so forth. An image of a simple butt joint 112, when illuminated in this manner, is shown in FIG. 5. Discontinuities in the reflected pattern of stripes 114 are shown around the edges of plates 116 and 118 used to make the butt joint 112.

The approach described above is quite satisfactory for scenes having few, and relatively simple surfaces, and for which the camera-projector-target geometry is well understood and controlled. More complex scenes, such as box corners and others in which several planes are visible, can give rise to the "correspondence problem," i.e., confusion as to which stripe segment in the camera image belongs to which projected light plane.

Figure 6:
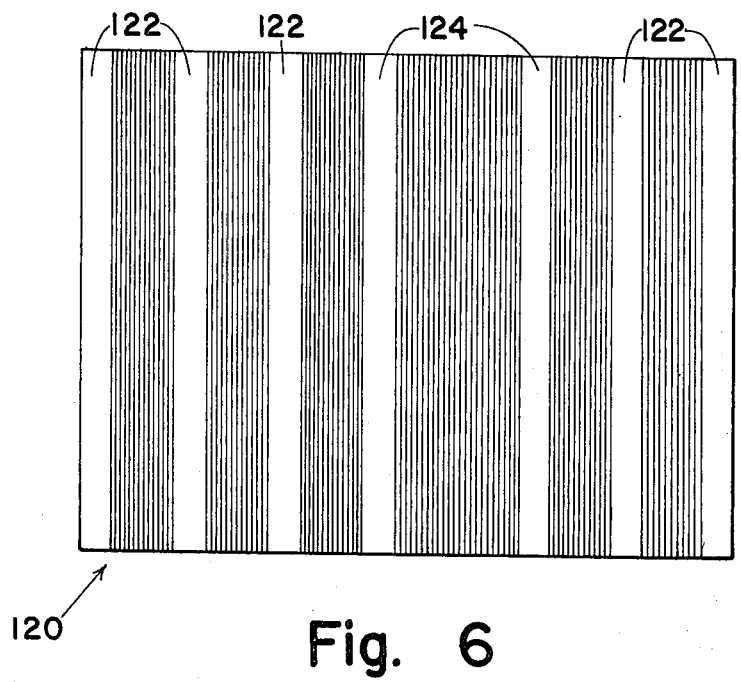
FIG. 6 is a plan view of a light pattern useful in the invention.

We have discovered that the correspondence problem can be solved if the projected array of light elements has at least one reference element having a unique spacing with respect to the spacing of other light elements in the array. FIG. 6 shows such an array 120. The array 120 has stripes 122 equally spaced from one another. Reference stripes 124 have a different spacing between them than the spacing between stripes 122. In this case, the spacing between the reference stripes 124 is twice the spacing between the other stripes 122. The identity of any reflected image of a stripe 122 may then be determined unambiguously with respect to the reference stripes 124. This additional information allows the correspondence problem to be solved.

Figure 7A:
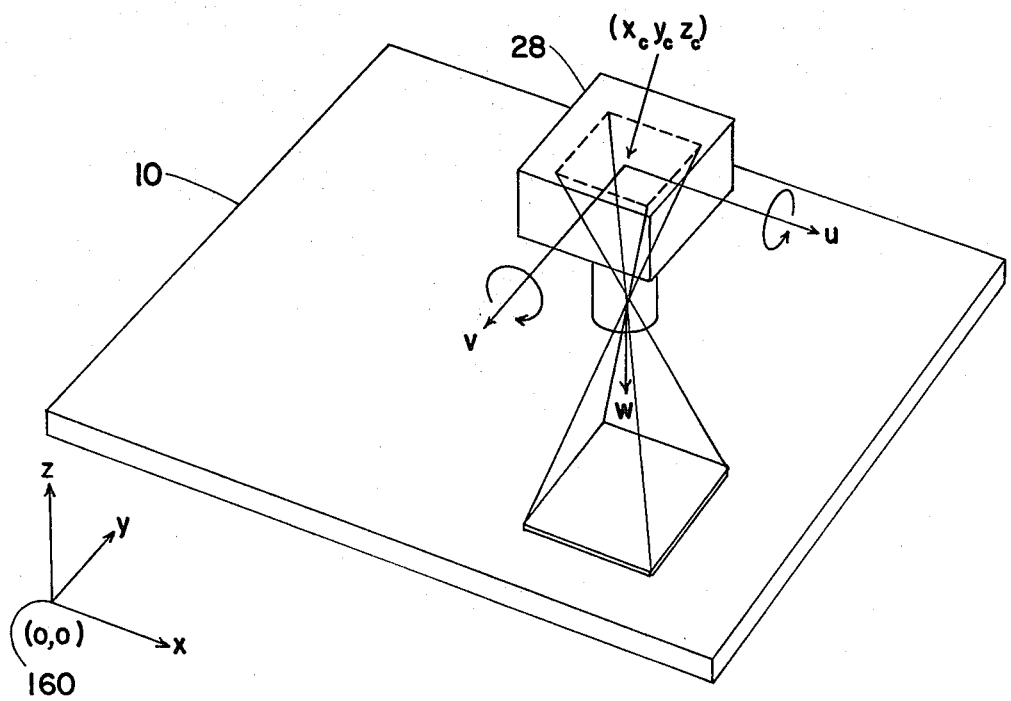
FIG. 7A is a perspective view of a portion of the apparatus of FIG. 1.
Figure 7:
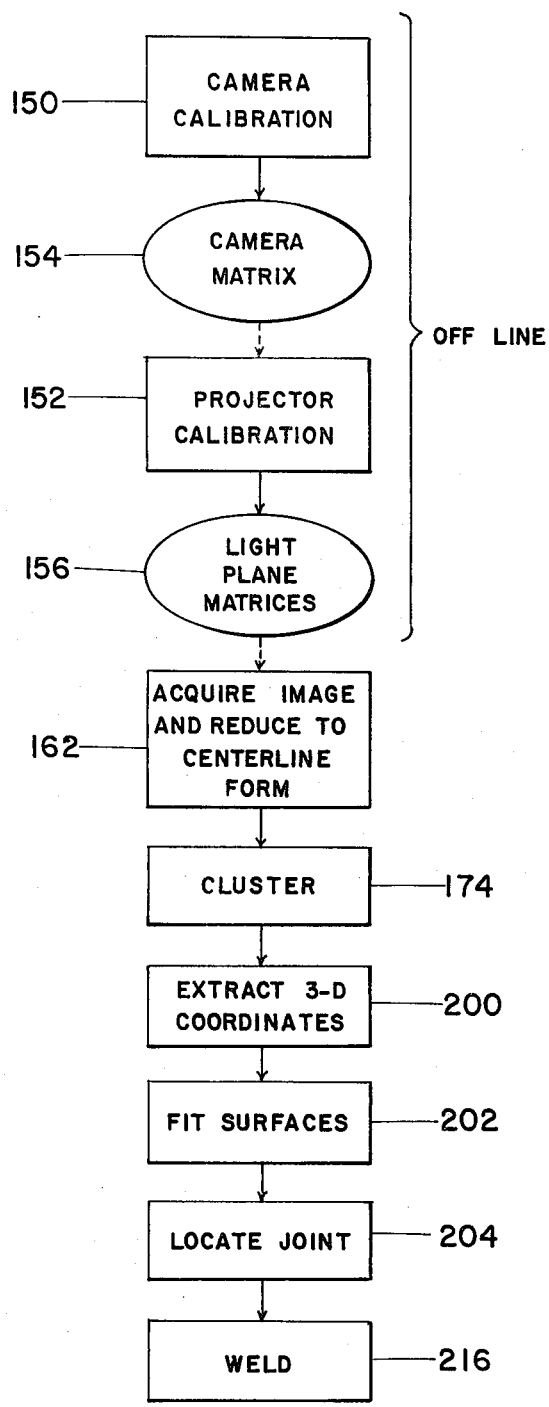
FIG. 7 is a flow diagram illustrating practice of the invention.

The array 120 of light elements as shown in FIG. 6 may be used with apparatus as shown in FIG. 1 in a novel process for controlling the weld head 18 in FIG. 1. FIG. 7 is a flow diagram of such a process. In the following explanation of the process, weld geometry will be limited to straight fillet and lap welds on flat plates. By restricting the geometry to flat planes and straight weld lines, the basic principles involved in the present apparatus and process can be demonstrated in a more straightforward manner. As will be seen, curved edges on flat planes to be welded can be reduced to a series of straight weld lines. Further, this system can be extended by routine modification of the disclosed software to other workpieces, such as parts including curved surfaces and circular welds.

The first two steps of camera calibration and projector calibration, indicated in FIG. 7 at 150 and 152, respectively, are performed off line when the system is initially set up to give a camera matrix, as indicated at 154, and light plane matrices, as indicated at 156. Camera calibration involves determination of a camera perspective transform, as well as scale factors, axis rotations, and translations necessary to convert from image coordinates in image plane 108 (FIG. 3) to the coordinate system of the x-y table, in object plane 100. This information constitutes output for use in the projector calibration as a single 4×4 homogeneous coordinate matrix.

Projector calibration establishes the three-dimensional equations of each light plane in the structured light pattern. These equations are combined with the homogeneous camera transform obtained by the camera calibration step to yield a set of 4×3 matrices, one for each light plane, that are used to transform the image coordinates for a point on a particular line directly into its corresponding x-y-z location in space. Further mathematical details on homogeneous coordinates and the computation of the matrices in the camera calibration and projector calibration steps are described more completely below.

To facilitate construction of parametric camera models and provide a more compact communication format for use with other system components (e.g., manipulators), it is convenient to represent the perspective transformation (Equation 1) and required axis rotation, translation, and scaling in homogeneous coordinates. This representation simplifies the computational mathematics involved in the transformation from image to "world" coordinates and also eliminates a problem of nonlinearity encountered in direct application of Equation 1.

Comprehensive descriptions of the derivation and use of homogeneous representation are known in the art. The following brief description will provide some insight into the utilization of this representation in the apparatus and process of this invention.

A point in three-dimensional space is represented in homogeneous coordinates as a four-element vector. If (x,y,z) are the coordinates of a point in three-dimensional space, the corresponding homogeneous representation is $$\begin{bmatrix} Sx \\ Sy \\ Sz \\ S \end{bmatrix}.$$

Where S is a nonzero scale factor. Mapping a point from its homogeneous coordinates to the conventional three-dimensional form involves simply dividing by S.

Any geometric transformation, such as translation, scaling, and rotation, is represented in homogeneous coordinates by a 4×4 matrix. For example, the perspective transformation given by Equation 1 is represented in homogeneous coordinates as $$\begin{bmatrix} 1 & 0 & 0 & 0 \\ 0 & 1 & 0 & 0 \\ 0 & 0 & 1 & 0 \\ 0 & 0 & 1/f & 1 \end{bmatrix}.$$

Similarly, rotating a point (x,y,z) through an angle $\theta$ about the z axis is represented as $$\begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}.$$

Successive transformations of a single point may be concatenated by forming the product of the appropriate transformation matrices. For example, if P is the above perspective matrix, and R the rotation matrix, then the image coordinates, (u,v) of the point (x,y,z) obtained when the camera is rotated by an angle $\theta$ about the z axis will be given by $$\begin{bmatrix} Su \\ Sv \\ Sw \\ S \end{bmatrix} = P * R * \begin{bmatrix} x \\ y \\ z \\ 1 \end{bmatrix}.$$

This matrix product may be represented by a single matrix which is the product of all of the respective transformations.

The term "calibration" is used with respect to the camera 28 (FIG. 1) to describe a technique for establishing a parametric model of the camera system. This model then enables measurements made in the coordinate system of the image to be related to a fixed, absolute world coordinate system. This capability is necessary for several reasons:

Communication between the camera and manipulator systems is simplified if both operate in a common coordinate frame. In fact, it is customary to choose the world system as being that used by the manipulator, but to use the calibration procedure to establish the relationship of the camera to this system.

Selection of welding parameters and procedures is dictated in part by the spatial orientation of the joint (e.g., overhead, vertical, or flat). This information cannot be derived from simple relative measurements.

Information concerning workpiece dimensions and details may be more easily encoded when referenced to an absolute coordinate system, rather than on a relative, point-by-point basis.

The parametric model of the camera consists of a single 4×4 homogeneous coordinate matrix that combines camera perspective transformation, axis translations, and rotations necessary to transform measurements made on a camera image into the coordinate system of the x-y table. The linear constraint necessary to infer a three-dimensional structure from a two-dimensional image is determined during projector calibration by combining the camera model with the three-dimensional equations of the light planes. The result is a set of 4×3 matrices, one for each plane, that allow direct computation of the three-dimensional coordinates of any point in the camera's field of view from the corresponding image coordinates. The creation and use of the camera model and the two- or three-dimensional conversion matrices will now be described with the aid of FIG. 7A.

1. CAMERA CALIBRATION

The camera 28 is shown above x-y table 10 in FIG. 7A. the origin of the world coordinate system is taken to be the O,O point of the x-y table, as indicated at 160. The camera 28 is translated from this origin by an amount $x_c, y_c, z_c$, panned about the y axis through an angle $\theta$, and tilted about the x axis through an amount $\phi$. If the focal length of the camera lens is f, we can define the camera matrix C to be $$C = \begin{bmatrix} 1 & 0 & 0 & 0 \\ 0 & 1 & 0 & 0 \\ 0 & 0 & 1 & 0 \\ 0 & 0 & 1/f & 1 \end{bmatrix} * \begin{bmatrix} \cos\theta & \sin\theta & 0 & 0 \\ -\cos\phi\sin\theta & \cos\phi\cos\theta & \sin\phi & 0 \\ \sin\phi\sin\theta & -\sin\phi\cos\theta & \cos\phi & 0 \\ 0 & 0 & 0 & 1 \end{bmatrix} * \quad (1)$$

$$\begin{bmatrix} 1 & 0 & 0 & x_c \\ 0 & 1 & 0 & y_c \\ 0 & 0 & 1 & z_c \\ 0 & 0 & 0 & 1 \end{bmatrix},$$

that is, the product of the matrices representing the rotation, translation, and the perspective transform. This matrix has the property:

$$\begin{bmatrix} Su \\ Sv \\ Sw \\ S \end{bmatrix} = C \begin{bmatrix} x \\ y \\ z \\ 1 \end{bmatrix}, \quad (2)$$

where x,y,z are the world coordinates for a point in space, and u,v are its corresponding image coordinates defined in the camera (Cx,Cy) system.

The matrix C may be obtained by direct measurement of the angles $\theta$ and $\phi$, the translation $x_c, y_c, z_c$, and the known focal length of the lens. This procedure, however, is somewhat tedious and error-prone. This will be especially true if the camera is moved often (whether intentionally or otherwise), the internal camera geometry is unstable, or if the lens is less than optically perfect.

The technique used here averts these problems, and renders the system almost "self-calibrating" by simply making a number of measurements on targets of known height that are placed on the x-y table and moved to a set of known locations. The camera matrix C is then computed by a simple least-squares fitting procedure described below. In this way most explicit measurements are eliminated (except, of course, the height of the target) and the various sources of error in the system (e.g., linear optical distortions, systematic lead screw errors, and camera tilt) treated as a lumped constant.

This procedure assumes that all errors are linear, an assumption which has proved valid in practice.

The relationship between any point $x_i$, $y_i$, $z_i$ in the world coordinate system and its corresponding image point $u_i$, $v_i$ is $$\begin{bmatrix} Su_i \\ Sv_i \\ Sw_i \\ S \end{bmatrix} = \begin{bmatrix} C_{11} & C_{12} & C_{13} & C_{14} \\ C_{21} & C_{22} & C_{23} & C_{24} \\ 0 & 0 & 1 & 0 \\ C_{41} & C_{42} & C_{43} & 1 \end{bmatrix} \begin{bmatrix} x \\ y \\ z \\ 1 \end{bmatrix} \quad (3)$$

where ($C_{ij}$) is the camera matrix described above. Note that in the third row all but the diagonal element are 0, because we do not solve for the third image coordinate, w. The last element of the fourth row can be set to 1, since it is involved only in computation of the arbitrary scale factor, S. If we measure a set of these points, $i=1, \ldots, n$, then we may combine the individual relations into a single matrix:

$$\begin{bmatrix} u_1 \\ v_1 \\ u_2 \\ v_2 \\ \vdots \\ \vdots \\ \vdots \\ u_n \\ v_n \end{bmatrix} = \begin{bmatrix} x_1 & y_1 & z_1 & 1 & 0 & 0 & 0 & 0 & -x_1u_1 & -y_1u_1 & -z_1u_1 \\ 0 & 0 & 0 & 0 & x_1 & y_1 & z_1 & 1 & -x_1v_1 & -y_1v_1 & -z_1v_1 \\ x_2 & y_2 & z_2 & 1 & 0 & 0 & 0 & 0 & -x_2u_2 & -y_2u_2 & -z_2v_2 \\ \vdots & & & & & & & & & & \\ 0 & 0 & 0 & 0 & x_n & y_n & z_m & 1 & -x_nv_n & -y_nv_n & \end{bmatrix} \begin{bmatrix} C_{11} \\ C_{12} \\ C_{13} \\ C_{14} \\ C_{21} \\ C_{22} \\ C_{23} \\ C_{24} \\ C_{41} \\ C_{42} \\ C_{43} \end{bmatrix} \quad (4)$$

Letting U be the vector of image coordinates, W the matrix of constants and world coordinates, and T the vector of $C_{ij}$'s, this equation can be rewritten as:

$$U = W*T \quad (5)$$

This equation can be solved directly for the best least-squares solution for T by means of the simple equation:

$$T = (W^T*W)^{-1}*W^T*U \quad (6)$$

This procedure requires a minimum of 6 points, because there are 11 coefficients, each appearing in two linear equations.

2. PROJECTOR CALIBRATION

The purpose of calibrating the projector is to derive the coefficients for the equations of each light plane. This is accomplished by obtaining images of the pattern as it is reflected from surfaces, at various known heights, placed parallel to the plane of the x-y table. In each image a set of x and y values for an arbitrary number of points along each light stripe 122 and 124 (FIG. 6) is computed and stored, using the known height z. When a sufficient number of images is obtained (e.g., three), these measured coordinates are used to derive, by the least-squares method, the coefficients for the three-dimensional equation for each light plane. Thus $$A_i x + B_i y + C_i z + D_i = 0, \quad (7)$$

where $i=1, \ldots, n$ ranges over the number of light planes appearing in any one camera image. Several statistics are also computed, including the mean and variance of the spacing between the narrowly spaced stripes 122 as well as the ratio between the spacing of the reference stripes 124 and the narrowly spaced stripes 122. These data are output for use in locating the reference light stripes 124 in clustering, explained more fully below.

Once the light plane coefficients are known, the three-dimensional location of any arbitrary image point may be computed by means of the matrix equation:

$$\begin{bmatrix} x \\ y \\ z \end{bmatrix} = \begin{bmatrix} A - B & C \\ (C_{11} - uC_{41}) & (C_{12} - uC_{42}) & (C_{13} - uC_{43}) \\ (C_{21} - vC_{41}) & (C_{22} - vC_{42}) & (C_{23} - vC_{43}) \end{bmatrix} \begin{bmatrix} -D \\ (u - C_{14}) \\ (v - C_{24}) \end{bmatrix} \quad (8)$$

where x,y,z are the world coordinates corresponding to the image point u,v, $C_{ij}$ are the indicated elements of the camera matrix, and A, B, C, and D are the coefficients from Equation 6 for the light plane upon which the point lies.

Setting up and inverting this 3×3 matrix for each point to be measured could consume a significant amount of computer time and memory during real-time processing. To alleviate this problem, this matrix may be inverted and the indicated multiplication performed symbolically. When this is done, we find that the equation may be recast into the form:

$$\begin{bmatrix} S_x \\ S_y \\ S_z \\ S \end{bmatrix} = \begin{bmatrix} M_{11} & M_{12} & M_{13} \\ M_{21} & M_{22} & M_{23} \\ M_{31} & M_{32} & M_{33} \\ M_{41} & M_{42} & M_{43} \end{bmatrix} \begin{bmatrix} u \\ v \\ 1 \end{bmatrix} \quad (9)$$

which may be solved in a manner similar to the camera transform.

The matrices [$M_{ij}$], are obtained by solving 12 rather messy equations involving A, B, C and D, and the $C_{ij}$ appearing in Equation 3. Although this is rather time-consuming during calibration, it need be done only once per bar, rather than once per measured point as in Equation 4.

The output of the projector calibration procedure is this set of matrices, one matrix per light plane, along with the statistical parameters described above.

At the conclusion of the camera and projector calibration as explained above, the on line, real-time process steps of the invention may be carried out, beginning with image acquisition and reduction of the image to center line form, indicated at 162 in FIG. 7. These steps will be explained with the aid of FIGS. 8 through 10.

Figure 8:
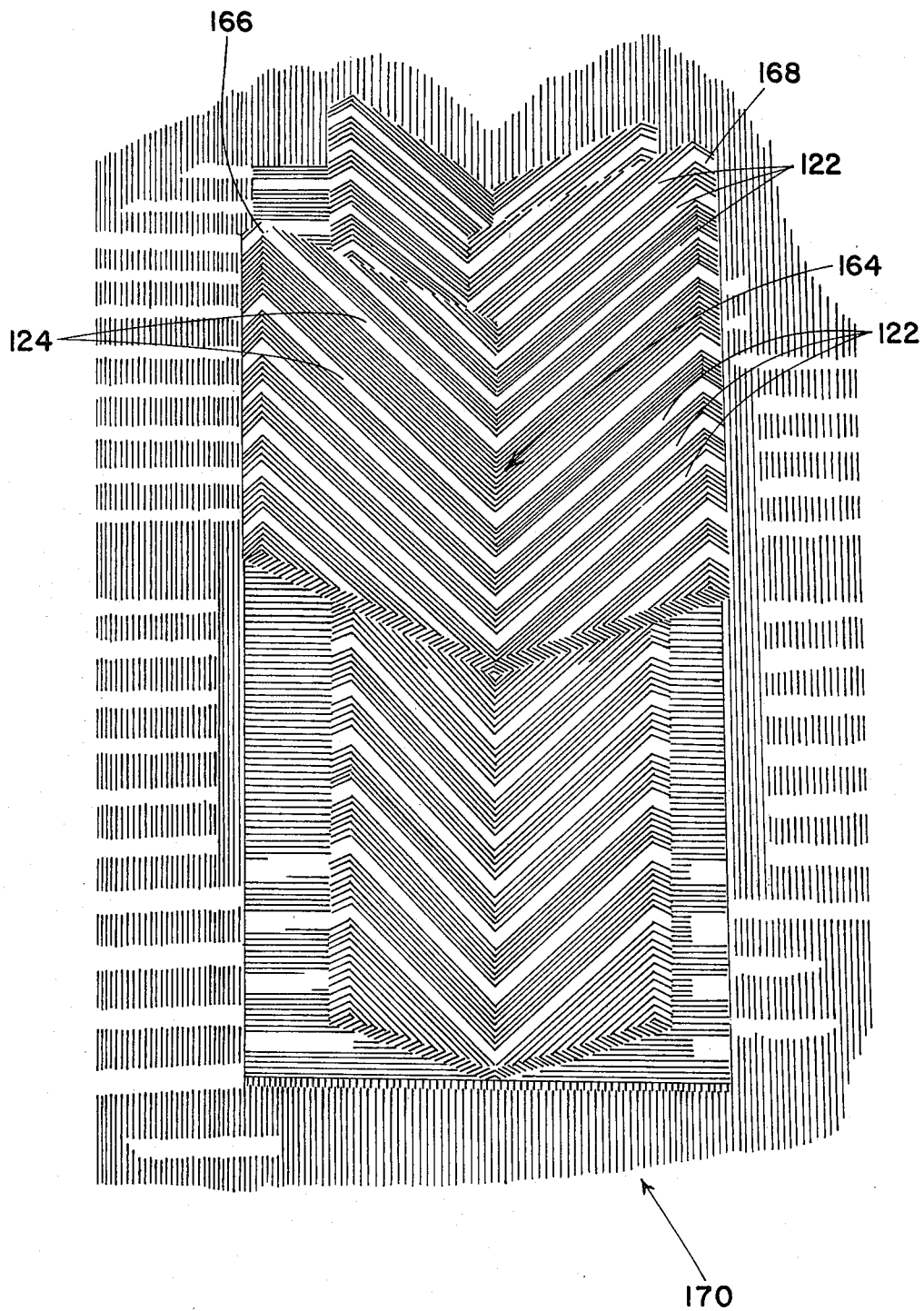
FIG. 8 is a perspective view of a workpiece during practice of the invention.
Figure 9:
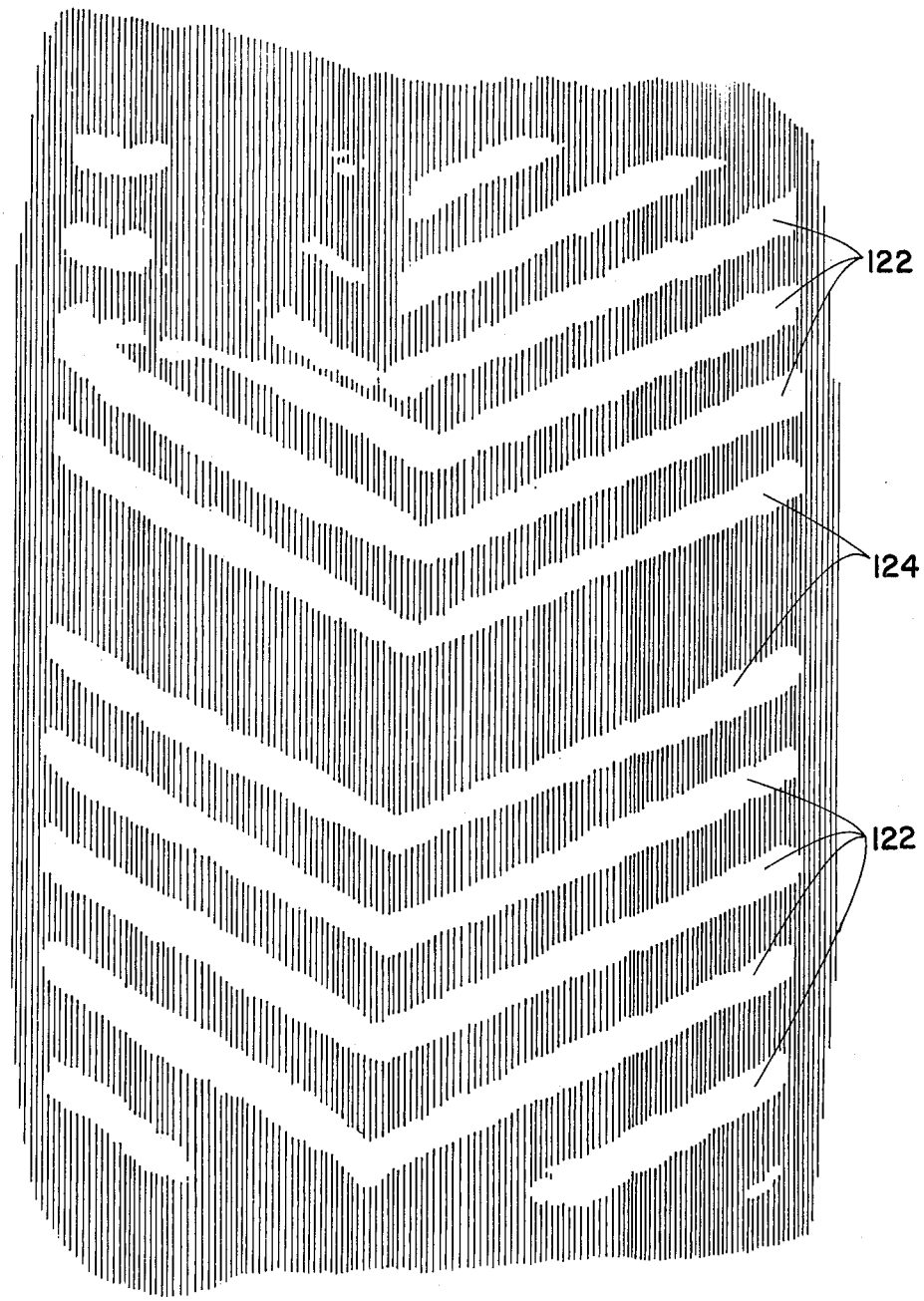
FIG. 9 is a plan view of patterns obtained in practice of the invention.

FIG. 8 shows a fillet joint 164 formed by intersecting plates 166 and 168, positioned in welding jig 170. An array of narrowly spaced light stripes 122 and reference light stripes 124 is projected on the plates 166 and 168 from light source projector 24 (FIG. 1), to give the reflected image shown in FIG. 8. The resulting grey scale image viewed by camera 28 (FIG. 1) is supplied to computer 38 through camera interface circuits 32 and converted into run length coded binary form by a thresholding operation. The resulting binary image of fillet joint 164 is shown in FIG. 9. For convenience, the same designations of 122 for the narrowly spaced light elements 122 and the reference light elements 124 is used in FIG. 9.

The accuracy of weld geometry characterization obtained through use of the process of this invention depends on the spacing of the narrowly spaced light elements 122. For heavy plate welding, in which the weld geometry needs to be accurate within about 0.030 inch (0.076 cm), a center-to-center spacing of about 0.25 inch (0.063 cm) and a spacing between the reference light elements of 0.5 inch (1.27 cm), has been found suitable to characterize weld geometry within an accuracy of 0.020 inch (0.051 cm). For smaller, more precise welds, a closer spacing between the light elements 122 and 124 would be required.

The initial processing of the binary image shown in FIG. 9 consists of a known form of connectivity analysis to extract the center line of each projected light element 122 or 124 in FIG. 9. The output of this initial processing is shown in FIG. 10 as a set of line segments 172, representing the center lines of the light elements 122 and 124, along with a set of line descriptors containing the initial and final image coordinates, the slope and x-intercept for each line segment 172 in the image of FIG. 10.

Figure 10:
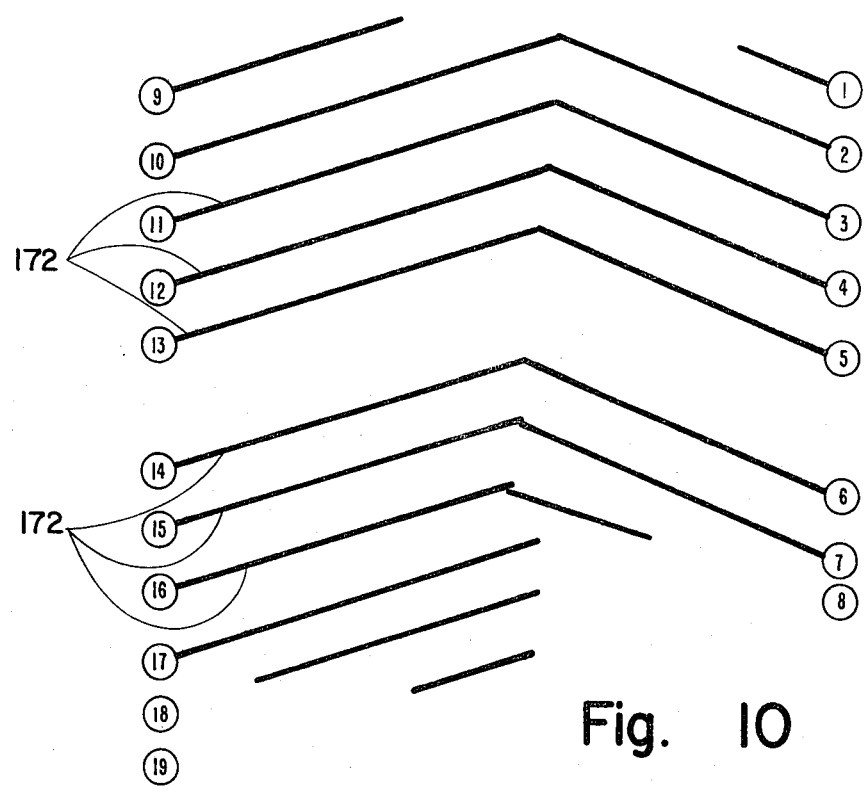
FIG. 10 is a resulting image obtained with the patterns shown in FIG. 9.

The fillet joint data represented in part by FIG. 10 is now ready for clustering, indicated in FIG. 7 at 174.

3. CLUSTERING

The plane surfaces comprising the joint 164 (FIG. 8) to be welded are reconstructed in the memory of computer 38 (FIG. 1) by grouping or "clustering" the line segments 172 (FIG. 10) obtained above according to various criteria. This clustering operation is designed to separate the image into its component planes and classify the line segments 172 belonging to each plane into discrete lists. This process consists of three steps:

(1) Decomposition of the scene into groups of surfaces with similar spatial orientation.

(2) Separation of each orientation group obtained by Step (1) into subgroups of surfaces with similar apparent heights.

(3) Subdivision of surface height groups obtained in Step (2) according to their lateral position in the image.

Figure 11:
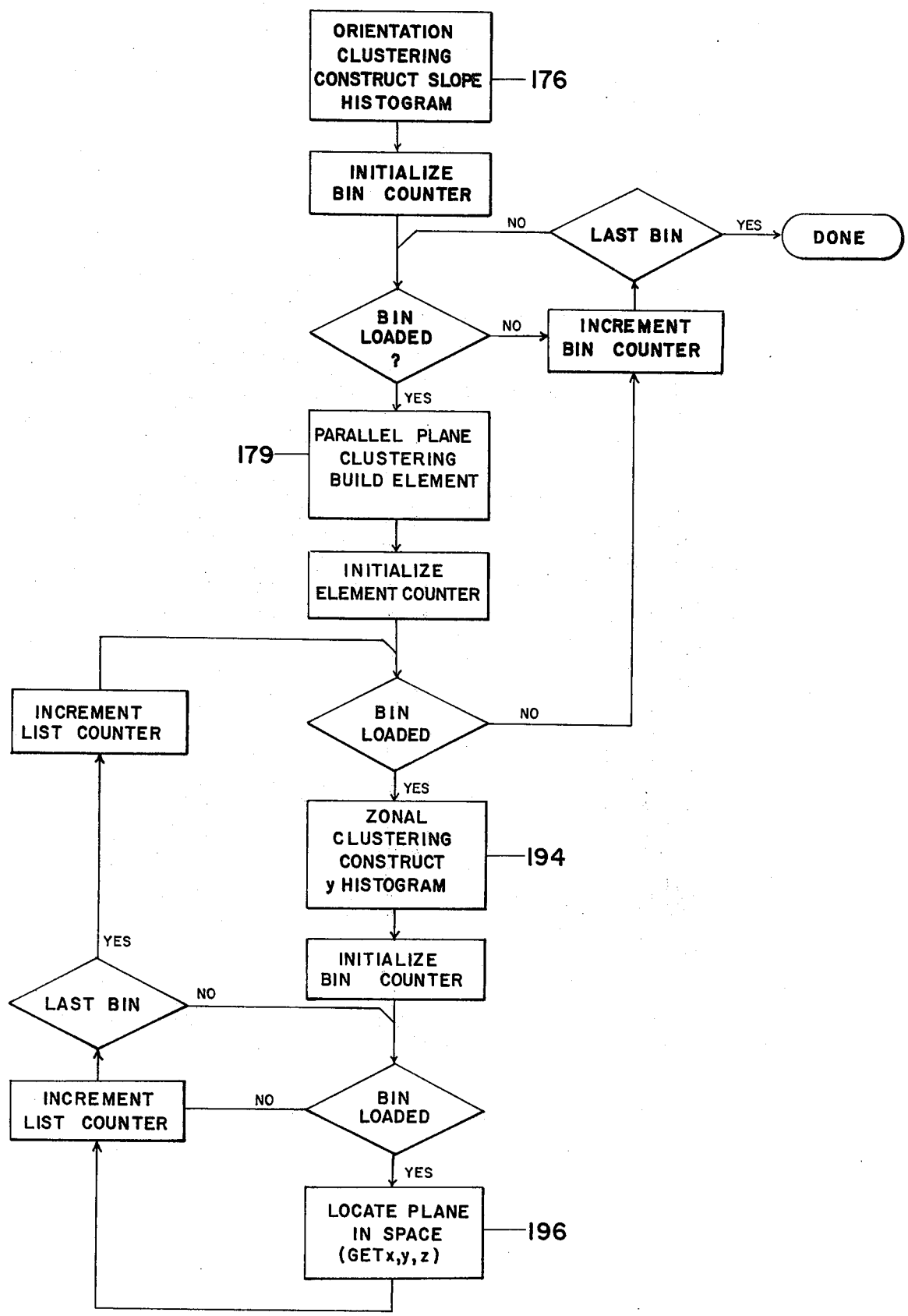
FIG. 11 is a more detailed flow diagram of a portion of the process of the flow diagram in FIG. 7.

A flow diagram of this processing is shown in FIG. 11. Operation of these different clustering processes is described below.

a. Orientation Clustering

From Equation (3) it is seen that a change in height (z coordinate) of the workpiece results in a shift in the u value of the spot's image. If, instead of a single spot, a bar of light parallel to the y-axis is projected, the image will be a line. The slope of this line will range from 0 (parallel to the v-axis), when the workpiece is parallel to x-y plane, to approximately $\tan \theta$ as the workpiece is tilted towards a more vertical orientation. If the scene being viewed consists of a number of flat surfaces at different orientations, the line image will be broken into a number of straight line segments separated by discontinuous changes in slope. If several parallel lines are projected, all of the lines reflected from a given surface will have the same slope and the outline of the surface may be inferred from the locations of the slope discontinuities.

Figure 12:
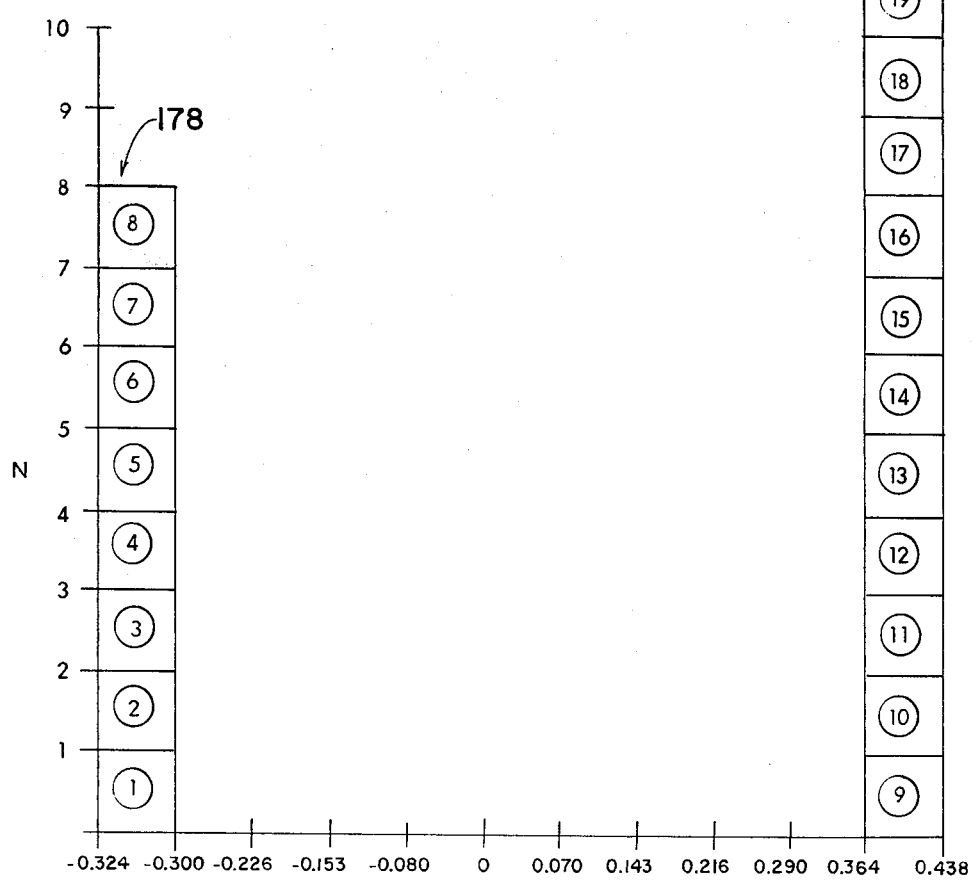
FIG. 12 is a plot of results obtained from the image of FIG. 10.

These properties are exploited in slope clustering, indicated at 176 in FIG. 11, to separate surfaces that have different orientations. This process may be described as a histogramming procedure in which line slopes are counted and each bin 178 (FIG. 12) of the histogram represents a narrow range of slope values. The slope of each line segment 172 (FIG. 10) in the image, computed during initial image processing, is examined and a line label (a pointer to the line descriptor in computer memory and represented by the circled numbers in FIG. 10) is deposited in the appropriate bin. The resulting distribution will have a peak corresponding to each different orientation. Thus, there are two peaks shown in FIG. 12, one for each bin 178.

If part of the fixture 170 (FIG. 8) also appeared in the processed image of FIG. 10, the lines reflected from it would be grouped with the part of the workpiece having the same orientation. In the next operation, indicated at 179 in FIG. 11, the lines reflected from the workpiece are separated from those reflected from a background that has the same orientation, but differs in height.

b. Separation of Parallel Planes

Just as abutting surfaces with different orientations result in image lines with slope discontinuities, so scenes with height discontinuities (i.e., overlapping workpieces) will produce line images with discontinuous changes in their u value. This situation occurs, for example, when a lap joint 180 (FIG. 14) is viewed from above, or if part of the jig 170 (FIG. 8) were shown in FIG. 10.

Separation of parallel, overlapping surfaces, is done by means of line-spacing statistics obtained during projector calibration. For example, in the lap weld image shown in FIG. 15, a list ordered by ascending average u value comprises all line segments appearing in the image (u increases from bottom to top in FIG. 15). The separation in u between the first two elements 182 and 184 of the list is calculated and compared to the mean separation, within a specified number of standard deviations (currently about 2.5), measured when the projector was calibrated. If the trial value falls outside this range, and is smaller than the calibrated mean, the process is repeated between the first element and the next unexamined element of the list (e.g., first element 182 and third element 186, first element 182 and fourth element 188, etc.) until the trial value falls within the specified range. When this occurs, the first element 182 of the list is removed and used as the first element of a new list, which will contain all the lines for the given surface. If the trial value is outside the tolerance range, it is compared to the spacing of the reference elements 190 and 192. If this comparison is within the specified bounds, the same action is taken; otherwise the loop proceeds. Iteration of this loop is continued, using the second element 184 of the two lines just compared as the initial (first) element.

When all the lines of the list have been so examined, a new list will have been created containing all of the lines belonging to one surface, and these lines removed from the original list. The process is repeated until each line in the original list has been assigned to a surface list and the original list exhausted, or until none of the remaining lines meet the above criteria. The height separation procedure is executed independently on each histogram bin loaded by the orientation-clustering procedure. For the lap weld joint 180 (FIG. 14), only one loaded bin will be found. In the case of the fillet joint shown in FIG. 8, however, this procedure will separate the workpieces 166 and 168 from the lower-elevation, but similarly oriented background surfaces of the jig 170.

Line segments with the same average u value, and hence belonging to surfaces at the same height, are grouped together by this procedure. This situation is encountered, for example, in the square butt joint 112 shown in FIG. 5. Further decomposition is necessary to resolve this difficulty.

c. Zonal Separation

This procedure is used to separate discrete workpieces that have the same orientation and height and is indicated at 194 in FIG. 11. It is used primarily to locate, for example, workpieces 116 and 118 comprising square butt joint 112 in FIG. 5.

Zonal separation or clustering is also a histogram process—the histogram, in this case, being the distribution of the average v* values for all of the lines belonging to a set of surfaces having the same orientation and height. The value v* is computed by rotating the u-v coordinate system so as to minimize the total variance of the set of average v values for the line group being examined. In particular, if $\phi$ is the computed angle of rotation, then:

$$v^* = v \cos \phi - u \sin \phi. \tag{4}$$

This rotated coordinate system is used to eliminate possible sources of error introduced by joint lines that run diagonally across the image.

Note that, in the case of the fillet and lap joints 164 (FIG. 8) and 180 (FIG. 14) described above, this process results in no further separation. Instead it serves only to transfer line data to the plane location and fitting procedures described below.

4. SPATIAL LOCATION OF WORKPIECES

As the image of each workpiece in a weld is isolated by the clustering procedures, its element data, consisting of the ordered lists described above, are processed to determine the three-dimensional (x-y-z) location of the workpiece. This step is indicated at 196 in FIG. 11.

The reference elements 124 (FIGS. 6 and 8) are first located by computing the ratio of the center-to-center spacing of each pair of elements 122 and 124 to the mean spacing of all the elements in the list. That pair of elements for which this ratio is greatest is taken to be the reference pair. This reference spacing ratio is also checked to be sure it is within the range encountered during calibration. If it is not, the image segment is rejected.

The ratio of center-to-center distances is used here because this value is relatively unaffected by changes in the apparent width or spacing of the elements. In a binary image the apparent element width will change because the intensity of the light reflected into the camera from the marginally illuminated element edges will vary with the reflectivity of the surface. The absolute spacing of the elements will become smaller as the workpiece is moved closer to the camera.

Once the reference elements 124 are located and, consequently, the index of each element 122 and 124 determined, the x, y, and z coordinates for the endpoints of each element 122 and 124 are calculated by using the procedure described above. This step is indicated at 200 in FIG. 7.

The output of this procedure is a plane descriptor block containing the average x, y, and z values (apparent centroid) for the surface of each workpiece e.g., 166 and 168 in FIG. 8, and lists containing the u, v, x, y, and z values for the endpoints of all line segments comprising the workpiece image. There are two such lists, one for points at the "top" (minimum v) of the image and the other for those at the bottom (maximum v).

5. SURFACE FITTING

A parametric description of the joint geometry is obtained by fitting a mathematical surface to the data obtained from the previous step. The fitting step is indicated in FIG. 7 at 202. The surface used could be any analytic shape appropriate to the particular application. A comprehensive program for the apparatus of this invention would include subroutines for classifying the surfaces in order to select from appropriate formulas for further analysis of the workpiece in accordance with this invention. In pipe welding, for example, it would be appropriate to fit conic sections, such as an ellipse or circle. For very complex shapes other, higher-order curves might be used.

For the purposes of this application and by way of example, three-dimensional flat planes of the form:

$$Ax + By + CZ + D = 0 \tag{5}$$

are fitted.

This equation is fitted to the element endpoint data using the least squares method. The parameters A, B, C, and D are normalized so that A, B, and C are the direction cosines of the surface normal with respect to the x, y, and z axes, and D is the perpendicular distance from the origin to the plane surface. Note that the sign of D indicates on which side of the origin the plane lies.

These parameters, along with the edge and centroid data, are recorded in surface descriptor blocks.

6. JOINT LOCATION

This step is indicated in FIG. 7 at 204. To facilitate joint location by using simple geometric descriptions, the surface descriptor blocks described above are organized into linked lists according to the relative position of each surface in the space. There are three such lists, arranged in ascending order according to the average x, y and z values respectively. Note that each surface appears once in each list. The relative position of a given surface is indicated by its position in each list.

The use of these data structures, for location of fillet and lap joints, as well as of the parametric data obtained during surface fitting, is described below.

a. Fillet Joint Location

Figure 13:
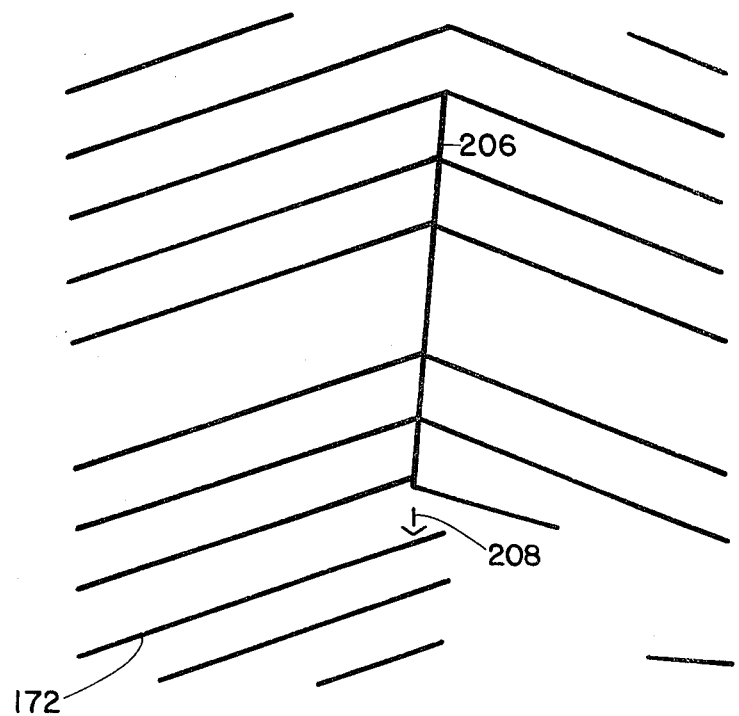
FIG. 13 is a display output of results obtained from analysis in accordance with the invention of the image in FIG. 10.

A simple fillet joint, shown in FIG. 8, consists of two plates 166 and 168 that meet at an angle of, typically, 90 degrees. Defining the expected joint line to be approximately along the x axis, fillet joint 164 location proceeds in the following manner. The image is traversed in the y direction (perpendicular to the expected joint line) by stepping down the y-list. This list is searched exhaustively until a pair of adjacent planes is found whose surface normals form a 90-degree angle (plus or minus 2 degrees) in the y-z plane. A check is also made to verify that this intersection point is on the front side of the weld. The exhaustive search technique used here may at first seem rather time-consuming, however, because of the small number of planes involved (usually no more than 4), this is actually an extremely rapid procedure. Results of this procedure 204 for the joint 164 in FIG. 8 are shown in FIG. 13 as they would be displayed on terminal 40 (FIG. 1). Line 206 identifies the joint 164. For ease of interpretation, the displayed data of FIG. 13 includes an identification by means of arrow 208 of the first line 172 beyond line 206 in a proposed welding direction. The weld will terminate at the identified line to insure a complete weld of the joint 164.

b. Lap Joint Location

Figure 14:
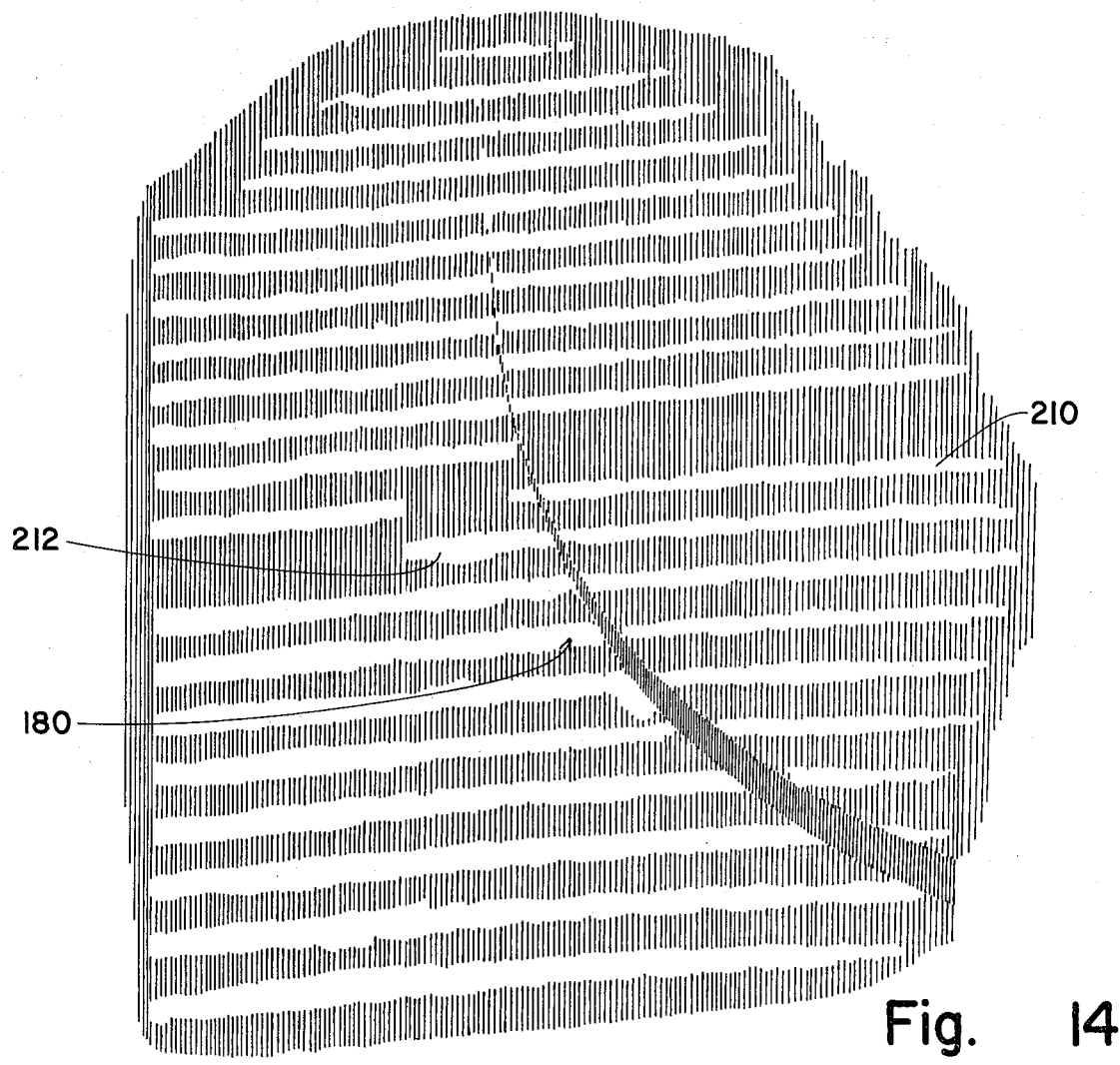
FIG. 14 is a perspective view of light patterns projected on another type of welding joint in practice of the invention.
Figure 15:
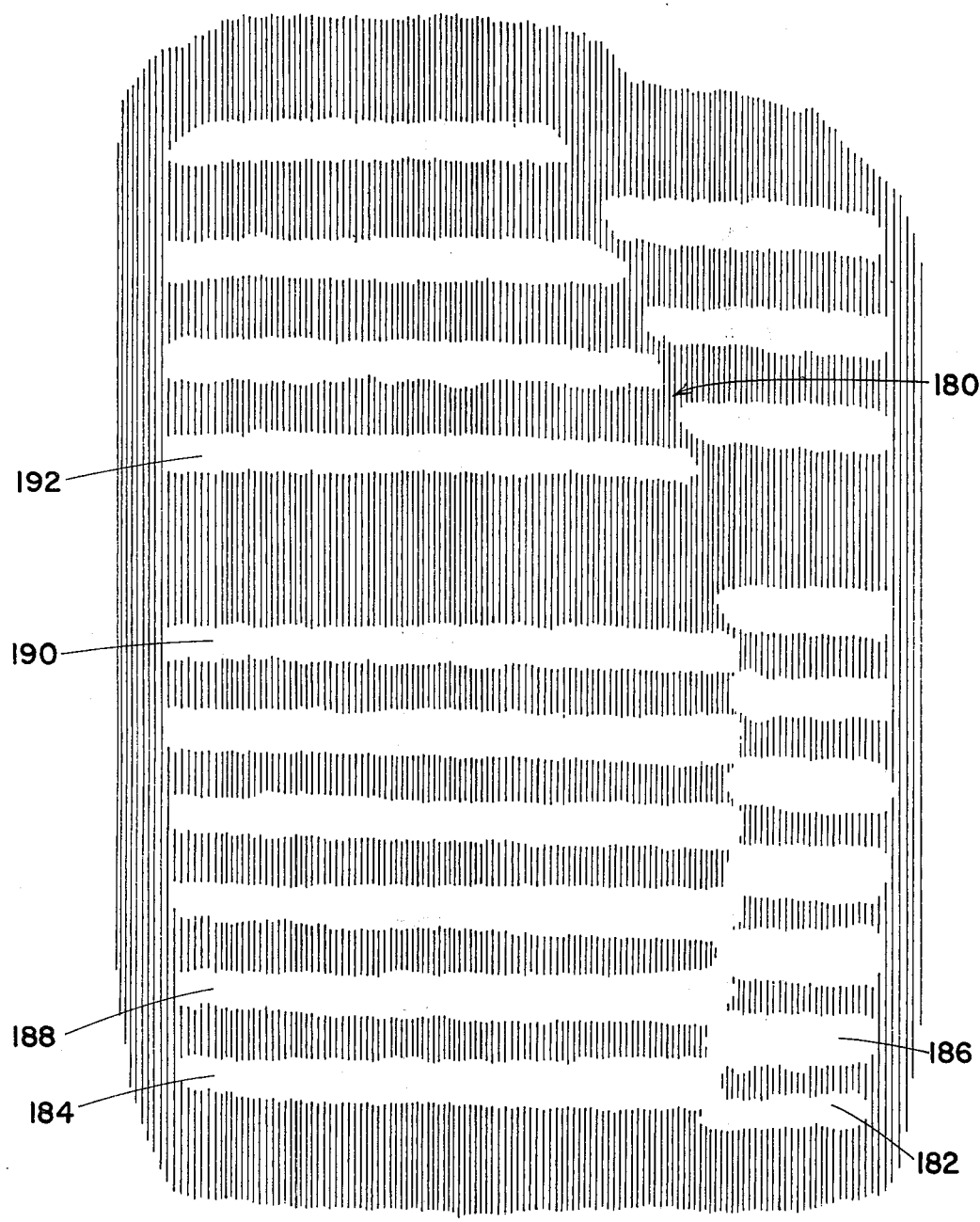
FIG. 15 is a plan view of an image obtained from the patterns in FIG. 14.

A typical lap joint 180 is shown in FIG. 14. The camera viewpoint in this case is directly above top plate 210, so that the vertical face (edge of the top plate) is not directly visible and the joint appears as a stacked assembly of two plates 210 and 212. The processed image of this joint is shown in FIG. 15.

The lap joint 180 is located by finding the step height discontinuity between the two plates. The last (highest) element in the z-list is taken as the top plate 210. The next lower element in the list is then checked to confirm that its average z value differs from that of the first element by the known thickness of the top plate. If this test is successful, the edge list for the top plate, along with a flag indicating the location of the joint face with respect to the joint line 180, is then passed to the joint line fitting procedure. Note that in this case the joint width is taken to be zero.

7. JOINT TRAJECTORY ESTIMATION

The joint path and fitup are defined by the workpiece edge data output by the locating procedures. A mathematical curve is fitted to these data to provide a parametric description of the three-dimensional trajectory. This is necessary for several reasons:

The mathematical description obtained may be used as a basis for spatial interpolation in manipulator control.

This model is necessary for splicing together joint path segments obtained from successive, overlapping images.

This estimated trajectory is used as a baseline for measurement of joint width. This width information might be used, for example, to control torch weaving amplitude or to select alternative welding procedures, such as "stringering" to fill a wide joint.

As with plane fitting, the type of mathematical curve to be used should be selected to best suit a specific application. For the simple workpieces used in these initial studies, we have chosen a straight-line model. This is acceptable here, since the disclosed embodiment uses a simple x-y manipulator with limited interpolation capacity.

Figure 16:
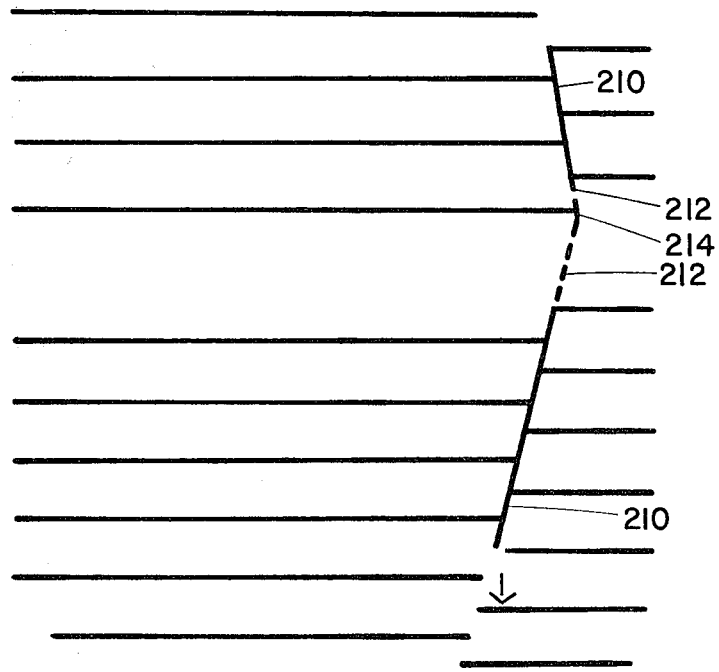
FIG. 16 is a display output of results obtained from analysis in accordance with the invention of the image shown in FIG. 15.

The edge point data are treated as the endpoints of run length segments, and the line indices are scan line serial numbers. These data are analyzed for connectivity and the straight line segments are fitted to the connected areas. The result of this procedure is shown as applied to the curved lap weld 180 (FIG. 14) in FIG. 16. Note that the curved joint line 180 has been broken into smaller straight line segments 210. In this case a continuum joint line is obtained by extrapolating each segment as indicated at 212 and joining them at their point of intersection 214.

After the baseline trajectory has been determined, the procedure steps down the line, calculating the width of the joint at each edge point. These data along with the path segment endpoints, slope, and y intercept, are recorded in a list for use by the manipulator controller 46 (FIG. 1). The welding may now be carried out, as indicated at 216 in FIG. 7, to give a completed joint weld utilizing the results generated with the apparatus and process of this invention to generate appropriate control signals for controller 46 in FIG. 1.

A further understanding of the invention may be obtained from the Appendix to this specification, which is a source listing of a program for computer 38 (FIG. 1).

It should now be apparent to those skilled in the art that a novel apparatus and process capable of achieving the stated objects of the invention has been provided. This apparatus and process is capable of characterizing three-dimensional welding joints and controlling the positioning of a welding head to carry out automatic welding of the joints on a real-time basis. The apparatus and process does not require the use of special configurations for different weld shapes. Because no sensor elements need to be placed near the workpiece being welded, the apparatus is suitable for use with a wide variety of weld shapes.

It should further be apparent to those skilled in the art that various changes in form and details of the invention as shown and described may be made. For example, the light source 24, camera 28 and welding gun 18 may be mounted on an arm of an, e.g., Cincinatti-Milacron T3 industrial robot, so that they move with respect to the workpiece 16, which may also either move as well or remain stationary. It is intended that such changes be included within the spirit and scope of the claims appended hereto.

What is claimed is:

1. A process for controlling positioning of an implement relative to a workpiece, which comprises:
   projecting a light pattern including an array of light elements, each having a known shape and spacing relative to one another, on the workpiece,
   sensing the array of light elements as reflected from the workpiece,
   clustering the sensed light elements into groups based on at least one common characteristic resulting from workpiece geometry of the light elements as reflected,
   defining a plurality of surfaces of the workpiece geometry by fitting a mathematical surface to at least some of the clustered groups of sensed light elements,
   defining the workpiece geometry from at least some of the defined surfaces, and
   controlling the positioning of the implement and the workpiece relative to one another based on the so-defined workpiece geometry.

2. The process of claim 1 in which the implement is a welding head.

3. The process of claim 2 in which at least two of the surfaces form a joint to be welded.

4. The process of claim 1 in which the sensed light elements are clustered into at least two groups, with each group containing light elements having a similar slope.

5. The process of claim 4 in which the light elements having a similar slope of each group are further clustered into sub-groups each having a similar distance from a predetermined point.

6. The process of claim 1 in which an edge of at least one of the mathematical surfaces is located by finding a step height discontinuity in the sensed light elements.

7. The process of claim 6 in which the implement is a welding head and the edge of the at least one of the mathematical surfaces is used to define a welding joint path for the welding head to follow with respect to the workpiece.

8. The process of claim 7 in which the welding joint is defined by fitting a curve to the edge of the at least one of the mathematical surfaces.

9. The process of claim 8 in which the curve is used as a baseline to measure welding joint width and the so-determined welding joint width is used to modify the welding joint path.

10. Apparatus for controlling positioning of an implement relative to a workpiece, which comprises:
means for projecting a light pattern including an array of light elements each having a known shape and spacing relative to one another on the workpiece,
means, spaced from said projecting means, for detecting the array of light elements as reflected from the workpiece and for producing first output signals in response to the detected light elements,
means for classifying the first output signals into groups based on at least one common characteristic resulting from workpiece geometry for the first output signals of each group,
means for defining workpiece geometry from at least one relationship between different ones of the groups of first output signals by defining a surface of the workpiece for each group of the first output signals, and for producing second output signals indicative of the so-determined workpiece geometry, and
means, responsive to the second output signals, for positioning the implement relative to the workpiece.

11. The apparatus of claim 10 in which the implement is a welding head.

12. The apparatus of claim 11 in which the at least one relationship between the first output signals of different ones of the groups of the first output signals are utilized to define an intersection between at least two surfaces of the workpiece.

13. The apparatus of claim 10 in which the light pattern projected by said means for projecting includes a plurality of lines including at least one line having a different spacing from an adjacent line than the spacing between any other lines in the array.

14. The apparatus of claim 13 in which any two adjacent lines of the array have a unique spacing between them.

* * * * *